United States Patent
Albayrak et al.

(10) Patent No.: US 6,622,591 B2
(45) Date of Patent: *Sep. 23, 2003

(54) STEERING WHEEL WITH DECORATIVE ELEMENT

(75) Inventors: Gökay Albayrak, Neuberg (DE); Michael Lehmann, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,212

(22) Filed: Aug. 8, 2001

(65) Prior Publication Data

US 2002/0026850 A1 Mar. 7, 2002

(30) Foreign Application Priority Data

Aug. 9, 2000 (DE) .................... 200 13 705 U

(51) Int. Cl.[7] .................... G05G 1/10; G05G 1/04; B62D 1/06
(52) U.S. Cl. .................... 74/552; 74/558; 74/558.5
(58) Field of Search .................... 74/552, 558, 558.5, 74/557; 280/750; 219/204, 476

(56) References Cited

U.S. PATENT DOCUMENTS

| | | | | | |
|---|---|---|---|---|---|
| 3,802,291 | A | * | 4/1974 | Young | 74/552 |
| 4,581,954 | A | * | 4/1986 | Uchida | 74/552 |
| 6,418,814 | B1 | * | 7/2002 | Emeneth et al. | 74/552 |
| 6,441,344 | B1 | * | 8/2002 | Bonn et al. | 219/204 |
| 2001/0054327 | A1 | * | 12/2001 | Ishii et al. | 74/552 |
| 2002/0017157 | A1 | * | 2/2002 | Kreuzer et al. | 74/552 |
| 2002/0029650 | A1 | * | 3/2002 | Emeneth et al. | 74/552 |

FOREIGN PATENT DOCUMENTS

DE 29910997 U1 12/1999
WO WO9833693 8/1998

OTHER PUBLICATIONS

A copy of U.S. Schuler Patent Application No. 09/598,138, filed Jun. 21, 2000, entitled Vehicle Steering Wheel, Attorney Docket No. TRW(ASG)4978.

* cited by examiner

Primary Examiner—Vinh T. Luong
(74) Attorney, Agent, or Firm—Tarolli, Sundheim, Covell & Tummino L.L.P.

(57) ABSTRACT

A steering wheel includes a hub, a steering wheel rim and at least one spoke connecting the hub and the steering wheel rim. At least one of the steering wheel rim and the spoke has a skeleton and a sheathing surrounding the skeleton. The steering wheel further includes at least one decorative element and at least one clamp element at which the decorative element is latched. The clamp element at least partly encompasses the sheathing.

3 Claims, 2 Drawing Sheets

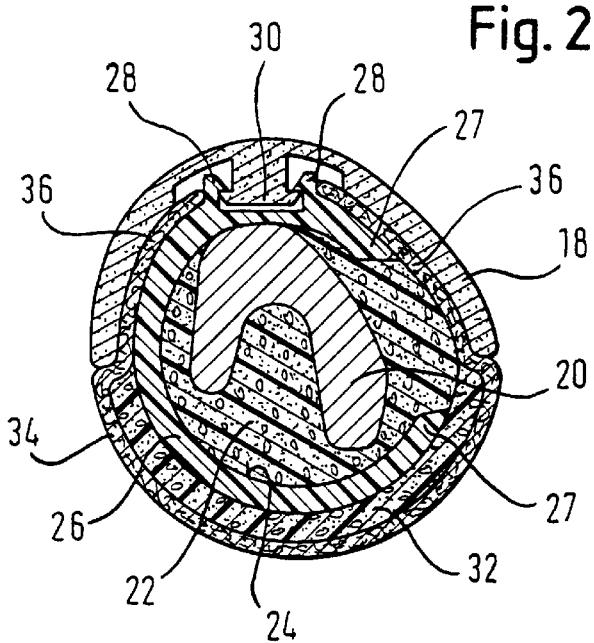
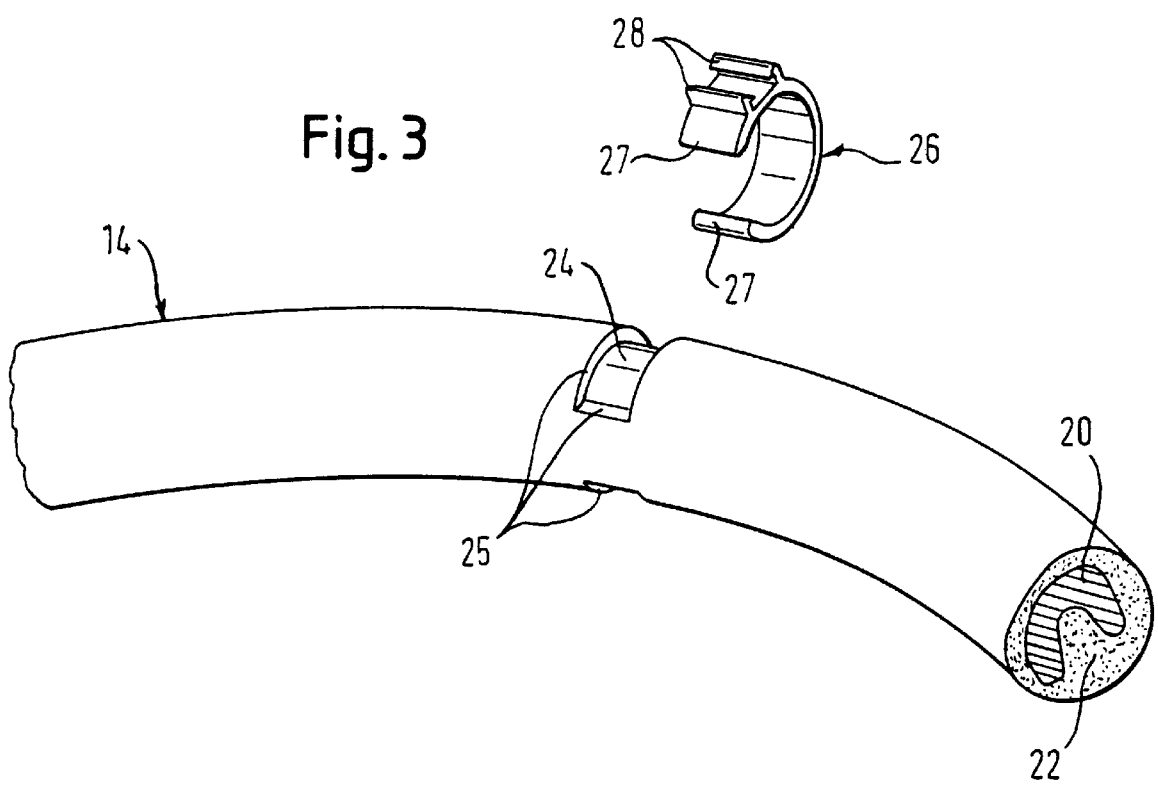

STEERING WHEEL WITH DECORATIVE ELEMENT

TECHNICAL FIELD

This invention relates to a steering wheel.

BACKGROUND OF THE INVENTION

To impart steering wheels a high-quality appearance, portions of the steering wheel rim may be provided with decorative elements which have a specially designed surface, e.g. wood, imitated wood or metal surfaces. It is of essential importance that these decorative elements are firmly connected with the steering wheel and are not detached from the steering wheel e.g. due to vibrations occurring while driving.

DE 299 10 997 represents a possibility of attaching a decorative element to the steering wheel rim, with a clamp element extending around the steering wheel skeleton and the clamp element being foam-coated except for latching elements disposed at the same, so that in the finished steering wheel it is disposed below the sheathing of the steering wheel. The decorative element has been clipped onto the latching element of the clamp element. The manufacturing effort for this kind of attachment is relatively high due to the sheathing of the clamp element.

BRIEF SUMMARY OF THE INVENTION

It is the object of the invention to create a simple and safe attachment for a decorative element on a steering wheel.

This is achieved in a steering wheel which comprises a hub, a steering wheel rim and at least one spoke connecting the hub and the steering wheel rim. At least one of the steering wheel rim and the spoke has a skeleton and a sheathing surrounding the skeleton. The sheathing is one of a foam casing and an injection-molded casing, i.e. a casing having a substantially reduced firmness and hardness with respect to the skeleton. The steering wheel further comprises at least one decorative element and at least one clamp element at which the decorative element is latched. The clamp element at least partly encompasses the sheathing. Thus, the clamp element is applied only after the sheathing of the skeleton has been applied. In this way, a sheathing of the clamp element can be omitted. Preferably, the invention relates to a steering wheel with a foam-coated skeleton.

Preferably, the sheathing has at least one recess for accommodating the clamp element. The recess may be a depression in the surface of the sheathing, which is adjusted to the geometrical dimensions of the clamp element. Preferably, the depth of the recess has been chosen such that the thickness of the clamp element corresponds to the depth of the recess and the clamp element is flush with the sheathing. The injection molding tool for producing the sheathing must be modified only slightly to produce such recess.

The recess may be designed such that there is formed a stop for fixing the clamp element in its position.

Preferably, the clamp element has a first latching element and the decorative element has a second latching element, the first and second latching elements making a latching connection with each other. Known latching connections, e.g. those with latching hook, are suited to connect the decorative element with the clamp element.

In a preferred embodiment of the invention, the clamp element has portions which are directly supported by the skeleton. In this case, the recess in the sheathing may be so deep that in a portion of the steering wheel rim the skeleton is exposed. In this portion, the clamp element encompassing the sheathing directly rests on the steering wheel skeleton, which increases the stability of the attachment.

In a preferred embodiment of the invention, the decorative element peripherally surrounds the steering wheel rim at least in portions as seen in cross-section, and the steering wheel rim is surrounded by an inlay in a portion of the periphery which is not surrounded by the decorative element. By means of such inlay, which may for instance consist of foamed material, the diameter of the steering wheel can be adapted to the decorative element, so that no edges are produced, as decorative element and inlay peripherally adjoin each other.

Preferably, a leather coating is provided by which the steering wheel rim is at least partly surrounded, the leather coating comprising edges which are clamped below the decorative element. In this way, fixing the leather coating in the vicinity of the decorative elements by means of sewing or bonding can be omitted.

The clamp element preferably has been clipped onto the sheathing. The clamp element preferably has a defined inherent elasticity, so that it firmly encompasses the steering wheel rim once it has been clipped onto the same.

In the preferred case, the clamp element does not protrude into the sheathing. Encompassing the sheathing, above all in conjunction with the recess and an inherent elasticity of the clamp element, turned out to be sufficient for fixing the clamp element and along with the same the decorative element in a stable position on the steering wheel.

BRIEF DESCRIPTION OF THE DRAWINGS

FIG. 2 shows a section through the steering wheel of FIG. 1 along line I—I or II—II of FIG. 1; and FIG. 3 shows a detail of a steering wheel according to the invention in a perspective exploded view.

DETAILED DESCRIPTION OF THE PREFERRED EMBODIMENTS

Figure 1:
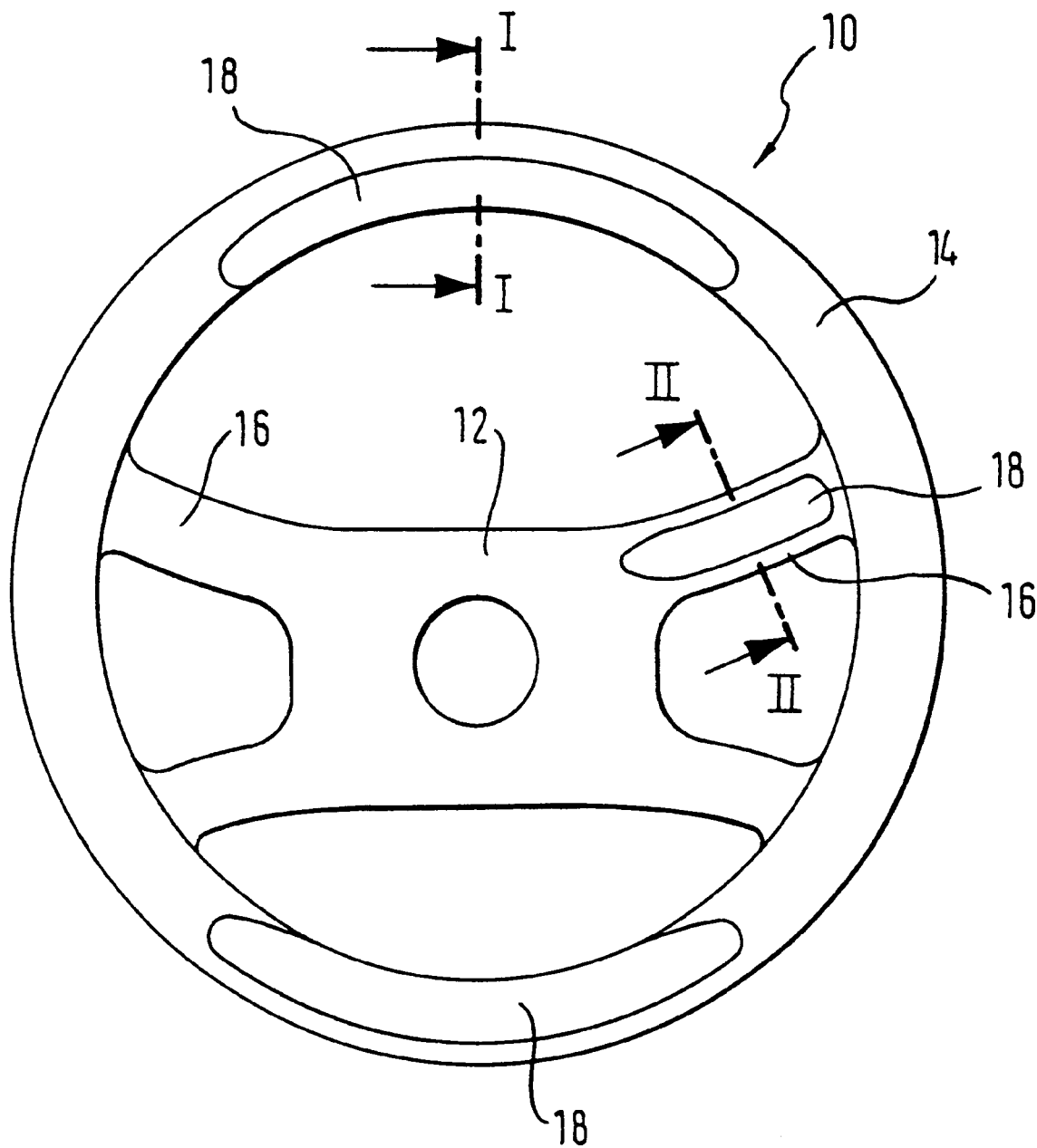
FIG. 1 shows a steering wheel according to the invention.

A steering wheel 10 according to the invention, which comprises a hub 12, a steering wheel rim 14 and spokes 16, is provided with decorative elements 18 along the steering wheel rim 14 and a spoke. These decorative elements 18 have a specially designed surface of e.g. wood, imitated wood, carbon fiber or aluminum.

FIG. 2 shows a section through the steering wheel rim 14 or through the spoke 16 in the region of a decorative element 18.

The steering wheel rim 14 and the spoke 16 include a skeleton 20, which is surrounded by a sheathing 22. In this context, the term "sheathing" 22 includes, on the one hand, foamed materials such as, for instance, PUR foam which is applied onto the skeleton by a known injection molding process. The sheathing 22 has a recess 24 (see also FIG. 3), into which a clamp element 26 has been inserted. In the recess 24, laterally and peripherally acting stops 25 are provided, which serve to fix the clamp element 26 in its position. Instead of the sheathing 22 consisting of a foamed material, there may also be provided, on the other hand, a sheathing which has been applied by injection-molding of a thermoplastic material, e.g. expandable PE or PP.

The clamp element 26 has a C-shaped design and has a defined inherent elasticity. It encompasses the sheathing 22 in the illustrated example for about 270°. The free ends 27 of the clamp element 26 rest against the stops 25 of the recess 24.

The clamp element 26 has a latching element 28 molded thereto. Radially outward of this latching element 28 a decorative element 18 is disposed, which on its lower surface facing the clamp element 26 has a latching element 30 molded thereto. The latching elements 28, 30 engage in each other, in order to fasten the decorative element 18 at the clamp element 26.

In a region disposed radially inward of the latching element 28, the recess 24 is designed so deep that the clamp element 26 directly rests on the skeleton 20 and is supported at the same.

In the region in which the steering wheel rim is not surrounded by the decorative element 18, the sheathing 22 and the clamp element 26, respectively, is covered by an inlay 32. This inlay 32 can likewise consist of a foamed material and serve to adapt the diameter of the steering wheel rim or the spoke to the decorative element 18 such that no edge is formed. In addition, the haptic performance of the steering wheel can be improved by the inlay 32.

In this example, the steering wheel rim 14 is surrounded by a leather coating 34, the edges 36 of which are clamped in the region of the decorative element 18 between the same and the sheathing 22 or the clamp element 26, in order to fix the leather coating.

The manufacture of the steering wheel according to the invention is effected as follows. The steering wheel skeleton 20 is encased (with a foamed material or an injection-molded thermoplastic material), the sheathing 22 and the recesses 24 being formed at the same time. The clamp element 26 is clipped onto the sheathing 22, with its free ends 27 encompassing the sheathing 22 and getting in contact with the stops 25. Subsequently, the steering wheel rim 14 is surrounded by the inlay 32, and the leather coating 34 is applied. Finally, the decorative element 18 with its latching element 30 is latched at the latching element 28 of the clamp element 26, the edges 36 of the leather coating 34 being clamped below the decorative element.

What is claimed is:

1. A steering wheel comprising a hub, a steering wheel rim and at least one spoke connecting said hub and said steering wheel rim, at least one of said steering wheel rim and said spoke having a skeleton and a sheathing surrounding said skeleton, said steering wheel further comprising at least one decorative element and at least one clamp element at which said decorative element is latched, said clamp element at least partly encompassing a radial outer surface of said sheathing, said decorative element peripherally surrounding said steering wheel rim at least in portions as seen in cross section, and wherein said steering wheel rim is surrounded by an inlay in a portion which is not surrounded by said decorative element.

2. The steering wheel is claimed in claim 1, wherein said inlay consists of a foamed material.

3. A steering wheel comprising a hub, a steering wheel rim and at least one spoke connecting said hub and said steering wheel rim, at least one of said steering wheel rim and said spoke having a skeleton and a sheathing surrounding said skeleton, said steering wheel further comprising at least one decorative element and at least one clamp element at which said decorative element is latched, said clamp element at least partly encompassing a radial outer surface of said sheathing, and a leather coating being provided by which said steering wheel rim is at least partly surrounded, said leather coating comprising edges which are clamped below said decorative element.

* * * * *